United States Patent [19]

Grigorian et al.

[11] Patent Number: 5,474,098
[45] Date of Patent: Dec. 12, 1995

[54] ADAPTER SYSTEM FOR ENGINE FLUSHING APPARATUS

[75] Inventors: Victor A. Grigorian, Glendale; Martin Renwick; Seymour Seplow, both of Sherman Oaks, all of Calif.

[73] Assignee: Envirolution, Inc., Glendale, Calif.

[21] Appl. No.: 279,950

[22] Filed: Jul. 25, 1994

[51] Int. Cl.⁶ ........................................ B08B 3/02
[52] U.S. Cl. ........................... 134/169 A; 134/169 R; 123/198 A
[58] Field of Search ............... 134/169 C, 169 R, 134/169 A, 201, 111; 123/198 A

[56] References Cited

U.S. PATENT DOCUMENTS

| | | | |
|---|---|---|---|
| 3,431,145 | 3/1969 | Riley | 134/22 |
| 3,489,245 | 1/1970 | Broadwell | 184/1.5 |
| 3,797,507 | 3/1974 | Jackson | 134/169 A |
| 5,048,578 | 9/1991 | Dorf | 141/346 |
| 5,063,896 | 11/1991 | Hyatt | 123/198 |
| 5,131,421 | 7/1992 | Hofbauer | 134/169 A |
| 5,168,844 | 12/1992 | Waelput | 123/196 |
| 5,232,513 | 8/1993 | Suratt et al. | 134/21 |

*Primary Examiner*—Frankie L. Stinson
*Attorney, Agent, or Firm*—Ronald M. Goldman

[57] ABSTRACT

Flushing apparatus for internally cleaning internal combustion engines includes an adapter system with sets of both oil port filter port and oil drain plug port adapter sets. For a kigiven engine a selected oil filter port adapter couples the fluid conduit from the flushing apparatus to the oil filter port on the engine block with the adapter allocating the flow of fluid between the two passages in that oil filter port in a predetermined ratio, approximately a ratio of 4 to 1, irrespective of the diameter of the oil filter port passages. A universal coupling member to which the adapter attaches is formed of two parts rotatably mounted to one another and includes a rotary gland. The companion set of oil drain plug port adapters for the flushing apparatus includes a universal coupling member of like construction.

13 Claims, 3 Drawing Sheets

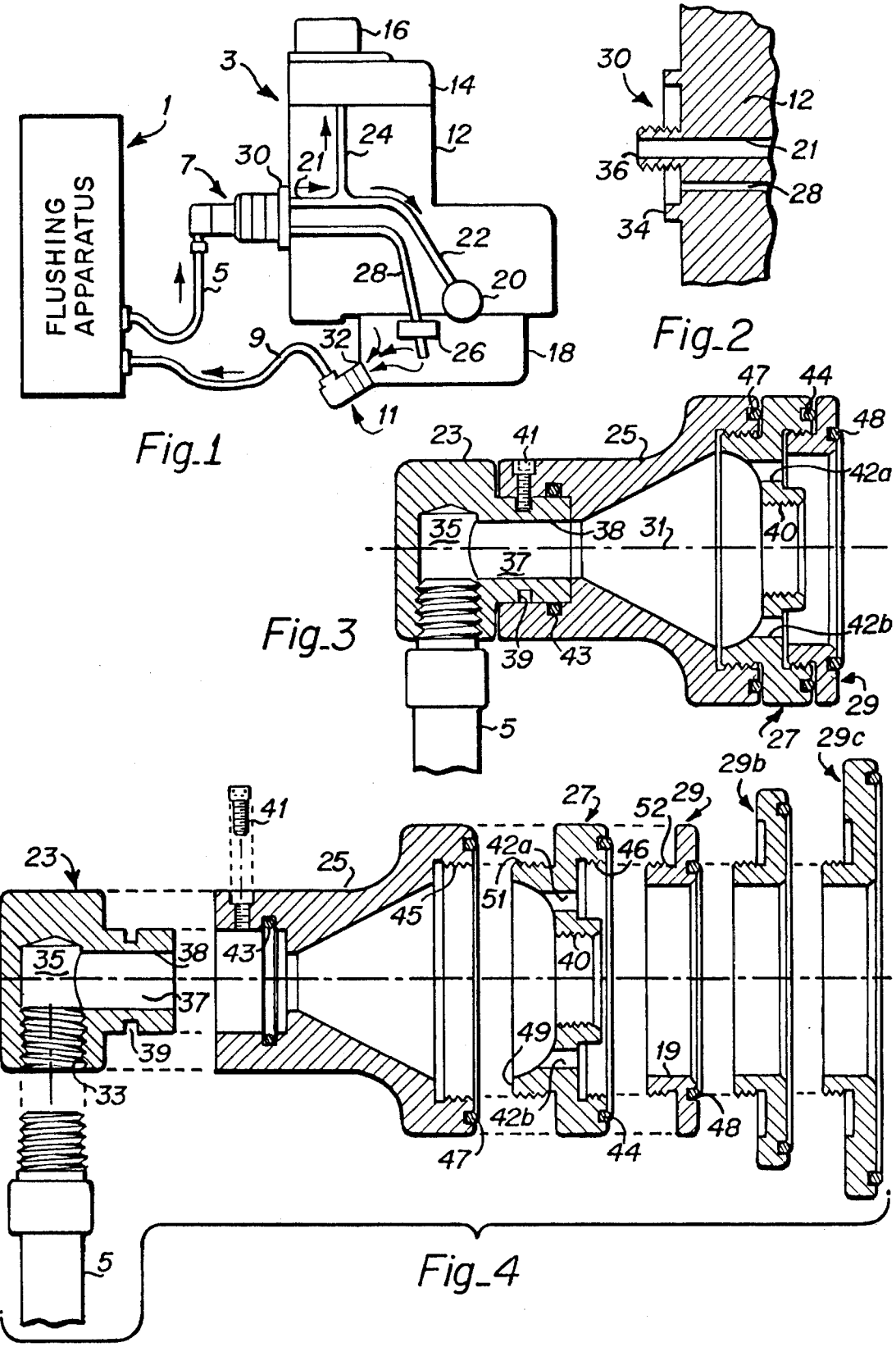

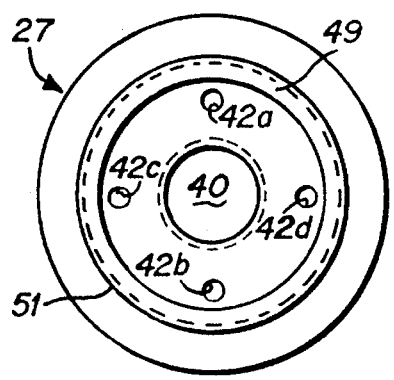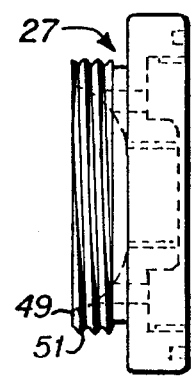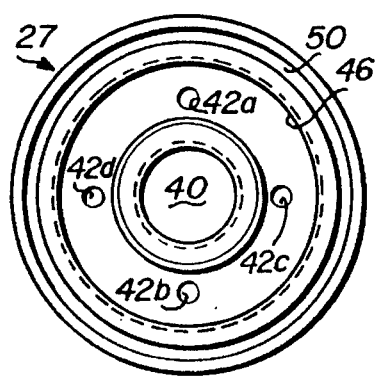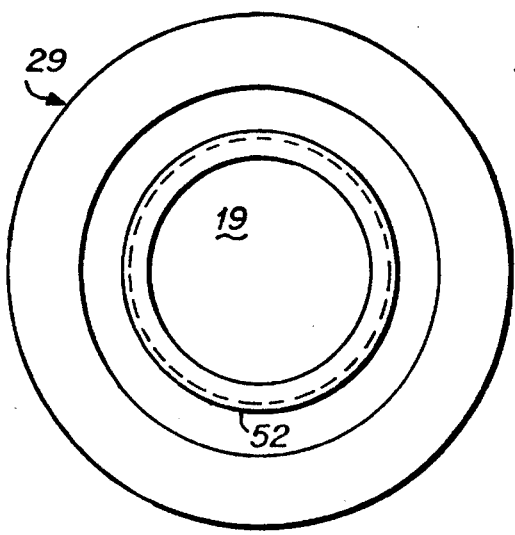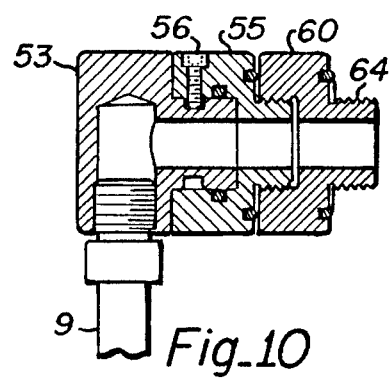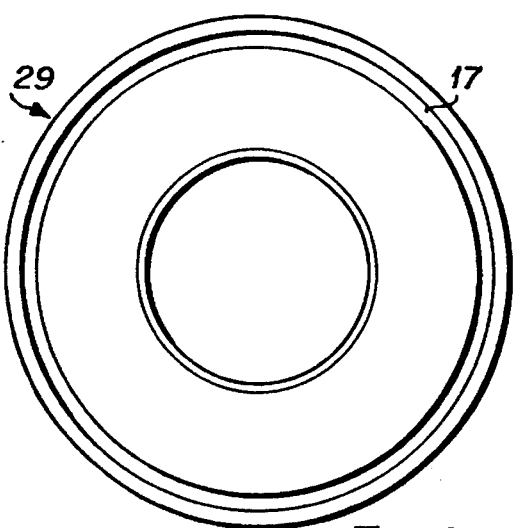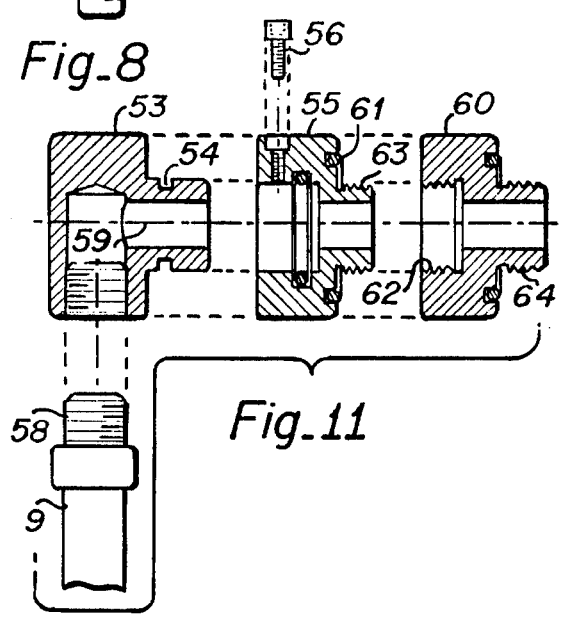

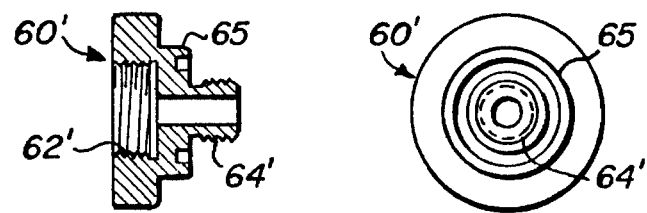
Fig_12  Fig_13
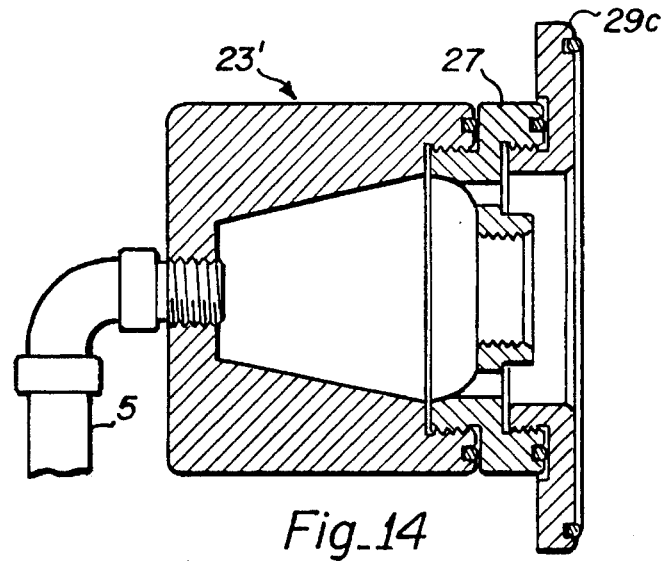
Fig_14
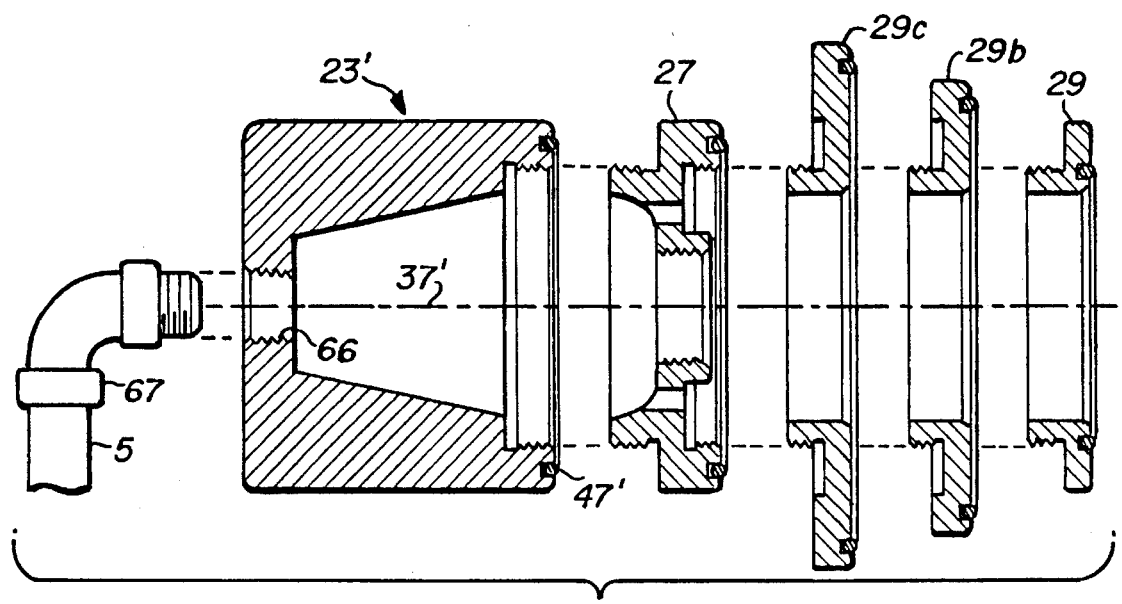
Fig_15

ADAPTER SYSTEM FOR ENGINE FLUSHING APPARATUS

FIELD OF THE INVENTION

The present invention relates to a flushing apparatus for internal combustion engines and, more particularly, to a novel adapter system for use in such apparatus, enabling the flushing apparatus to be connected to the oil drain pan and/or lubricating system of a large variety of internal combustion engines.

BACKGROUND

During operation of the internal combustion engine, oil, essential to operation of the engine, is taken from the oil pan, where stored, and circulated throughout the engine to lubricate the internal moving parts, including the crank shaft, cam shaft and pistons, to thereby minimize friction and wear of the engine's moving parts. For optimal engine operation and life, and for effective lubrication, the oil must be clean and maintain its lubricating qualities. To keep the oil free of the larger metal particles and dirt that inevitably are created and accumulate in the oil with continued engine use, a replaceable oil filter is carried on each engine. Additionally, to eliminate the more minute particles and acid that builds up in the oil, which the filter cannot remove, the engine oil pan is periodically drained and replenished with new oil; and a new oil filter is typically installed.

Even with such periodic maintenance not all the foreign particles are removed. Over time an oily "sludge" is formed within parts of the engine from such foreign particles, particularly in the oil drain pan. That sludge degrades engine performance. It also can release particles after the oil has been replaced and the presence of those particles in the oil leads to premature engine wear.

To reach and remove that sludge without disassembling the engine, engine flushing apparatus is known which treats the engine with a cleaning solution, circulating the cleaning fluid through the engine and oil drain pan from which the engine oil has been drained. In such flushing apparatus a conduit, typically a hose, capable of withstanding fluids under pressure, is connected to the oil filter port leading to the engine's lubrication system. Another conduit is connected to the drain plug port at the engine's oil pan. The flushing fluid is circulated from the apparatus through one conduit, into the engine, whereby the fluid ideally dissolves the sludge and collects any foreign particles in suspension. The flushing fluid exits the engine with the dissolved and suspended waste via the oil pan drain port and the second conduit, through which the now "dirty" flushing fluid is returned to the flushing apparatus for further processing or disposal.

Such conventional flushing apparatus continues circulating the cleaning fluid for a prescribed treatment period, which is a standard duration, irrespective of the make and model of the automobile. Since the size and type of oil filter port and oil pan drain port differs from automobile manufacturer to manufacturer and even amongst different models or model year of a single auto manufacturer, the prior flushing apparatus includes a necessary set of associated adapters to permit connection of the conduits to the respective oil filter and drain plug ports of the vast majority of automobile engines.

As example, U.S. Pat. No. 5,168,844 granted Dec. 8, 1992 to Waelput, describes a set of adapters for connection to the oil filter port and also describes a universal type of adapter, characterized by L-shaped metal fingers, for connection to the oil drain port. In such universal adapter, the L-shaped fingers form a part of a compression type fitting. They are inserted through the threaded drain hole and the bottom stems of the L are pressed against the inside surface of the oil drain pan by a pulling force applied to the stem. With a universal adapter, the set of different size threaded drain pan port adapters inevitably required for a flushing apparatus is avoided. However, experience showed that such L-shaped metal member, with time and use, could weaken and break, requiring replacement of the adapter, and, in the worst possible scenario, permit leakage of the cleaning fluid. In addition, for oil drain pan ports at the very extreme sizes, the very largest and very smallest ports, such universal adapter in applicant's view does not mate correctly.

A threaded coupling for that line is more rugged and, hence, more reliable than the foregoing, but unlike the drain pan adapter described in the Waelput patent, one size of threaded adapter coupling cannot universally fit the oil drain ports of the various models of automobile engines. Hence, different threaded couplings must be provided for the adapters in a set. The oil pan drain adapter for the present invention thus is a selected one of a set.

The oil filter mounting assembly contains two oil conduits or passages, one formed through the hollow of the threaded mounting post, which leads from the oil filter to the crankshaft and other moving parts within the engine block and at least one additional passage alongside, which leads to the engine oil pump. The cleaning solution being pumped by the flushing equipment through the oil filter is divided in the adapter and flows through both passages, cleaning the rocker arm assembly and the like accessible to the fluid through the first port passage, and cleaning the oil pump accessible through the second port passage.

By placing a size reducing threaded member on the adapter so that it may fit on the oil filter port as described in the Waelput patent, the central passage is narrowed and the adapter now fits the mounting post associated with the oil filter port of another automobile. With that narrower central passage, less of the cleaning fluid goes to the rocker arm assembly, where it is needed more, and proportionately more goes to the oil pump, where it is less needed. Consequently, if both automobiles are being cleaned with the cleaning fluid for the same period of time, the rocker arm assembly of the first automobile in the preceding example, receives more cleaning fluid flow, than the corresponding elements of the latter automobile. Typically the flushing equipment controls, among other things, the duration of flushing fluid flow, fifteen minutes, as example, and all automobile engines, no matter what make or model, receives the same fifteen minute duration of treatment. With that operation of the flushing equipment, one readily appreciates that the cleaning treatment of the first automobile is more effective than the second. Essentially the cleaning fluid being pumped through the oil filter, as between different makes and/or models of automobiles, having different diameter oil filter mounting posts that use different size threaded adapters in U.S. Pat. No. 5,168,844 is essentially uncontrolled.

An object of the present invention, therefore, is to provide a lubrication adapter that regulates the flow of cleaning fluid distributed in separate passages within the engine block, as between that flowing to the various engine components and that flowing to the engine oil pump, to a predefined ratio that provides greater efficiency in flushing operation.

Another object of the invention is to provide a cleaning solution adapter set in which the distribution of the flushing fluid within the engine remains essentially the same irrespective of the adapter selected from within the set so that the flushing fluid going to the various engine components and that going to the engine oil pump is maintained at a selected ratio irrespective of the make and model of engine receiving flushing treatment.

In fitting adapters to the engine, one finds that the many components and accessories packed in the engine compartment of modern automobiles provide formidable obstructions to installation of the adapter, a known problem. Often the hose connecting the adapter and flushing apparatus is relatively stiff and cannot be easily routed around obstacles, such as the oil drain pan port. Accordingly, another object of the invention is to provide an adapter coupling that has greater flexibility and can be more easily moved around obstacles.

SUMMARY OF THE INVENTION

A flushing system for cleaning internal combustion engines of a wide variety of makes and models which employs the engine's oil filter port to deliver the flushing fluid ensuring that the volume of fluid delivered through that port to the engine components, such as the crankshaft, receives a specified greater amount of fluid than that which is supplied through that port to the oil pump and drain pan, preferably by a factor of 4, irrespective of the make or model of engine.

Flushing apparatus for internally cleaning internal combustion engines in accordance with the present invention includes an adapter system with sets of both oil filter port and oil drain plug port adapter sets. For a given engine a selected oil filter port adapter couples the fluid conduit from the flushing apparatus to the oil filter port on the engine block with the adapter allocating the flow of fluid between the two passages in the oil filter port in a predetermined ratio, suitably a ratio of 4 to 1, irrespective of the diameter of the oil filter port passages.

In another aspect to the invention, a universal coupling member to which the adapter attaches is formed of two parts rotatably mounted to one another and includes a rotary gland. The coupling allows the hose to be moved more easily past obstacles in the engine compartment without permitting leakage of the flushing fluid. The companion set of oil drain plug port adapters for the flushing apparatus includes a universal coupling member of like construction.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustrations thereof presented in the accompanying drawings.

BRIEF DESCRIPTION OF THE DRAWINGS

In the Drawings:

FIG. 1 schematically illustrates the engine flushing system in operation, including the flushing apparatus, an engine, and the adapters;

FIG. 2 is a partial section view of the oil filter port of the internal combustion engine;

FIG. 3 is a cross section view of one embodiment of a oil filter port adapter, the oil filter port adapter constructed according to the invention;

FIG. 4 shows the embodiment of FIG. 3 in section in exploded view and also illustrates two additional alternative adapter elements;

FIGS. 5a, 5b and 6 illustrate the principal adapter used in the embodiment of FIG. 3 in front, side, and rear view, respectively;

FIG. 7 shows the secondary adapter used in the embodiment of FIG. 3 in front view, and FIG. 8 a side view thereof;

FIG. 9 is a rear view of the secondary adapter of FIG. 7;

FIG. 10 is a cross section view of an embodiment of an oil drain pan port adapter, constructed in accordance with the invention;

FIG. 11 shows the embodiment of FIG. 10 in an exploded view;

FIGS. 12 and 13 illustrate a drain port adapter intended for a recessed type drain pan in side section and front view, respectively; and FIGS. 14 and 15 illustrate an alternative embodiment of the oil filter port adapter, employing a one piece coupling, in respective section and exploded section view.

DESCRIPTION OF THE PREFERRED EMBODIMENTS

Reference is first made to FIG. 1 of the drawings, which schematically illustrates, in general, the engine flushing apparatus 1, which incorporates the adapters of the present invention, and an internal combustion engine 3 prepared to undergo the cleaning operation. A conduit or hose 5 connects the fluid output from the flushing apparatus to engine 3 by an adapter 7, the oil port filter adapter and a second conduit or hose 9, returns flushing fluid to the the flushing apparatus by means of another adapter 11 that is connected to the oil drain pan of the engine.

The operating components of the flushing equipment and of the engine are neither illustrated or described in detail since they are well known, are of a conventional structure and not necessary to an understanding of the present invention. However for purposes of facilitating a full understanding of the invention, brief note and illustration are made of the significant elements.

Flushing apparatus 1 contains the flushing fluid, typically a known cleaning solution, which is pumped from the flushing apparatus and is outputted through hose 5 to the engine. The returned "dirty" flushing fluid is piped back to the flushing apparatus through hose 9. The flushing apparatus includes appropriate electrical controls, not illustrated, to initiate operation and an electronic digital computer for controlling the operation of the various controls and the duration of the flushing treatment.

Engine 3 includes a block 12 which contains a cylinder head 14 and valve cover 16. An oil pan 18 is secured to the lower end of the engine. A crank shaft 20 within the engine block receives oil from passage 22. In like manner, the valves and other components within the engine block including the piston cylinder arrangement receive lubricating oil through a second oil passage 24. Oil is supplied to passages 22 and 24 by passage 21, from which the former passages branch out.

The oil pan is provided with a drain plug port 32. The port is a threaded opening. In normal engine operation, a threaded drain plug, not illustrated, is screwed into place sealing the drain pan and is removed only when it is desired to drain used oil from the engine.

An oil pump 26 located within oil pan 18 is connected by a fluid passage 28 to an oil filter port 30. In normal engine operation a conventional oil filter, not illustrated, is connected at this port. Pump 26 pumps engine oil from oil pan 18 via conduit 28 through the filter and exiting the filter flows via conduits 21, 24 and 22 into the engine, allowing the filter to remove particulate material and other impurities as may be contained in the oil before reaching crankshaft 20 and other engine components.

The oil filter port of most modern American automobiles is intended for self contained spin on type filters, such as the type FL-1A sold under the Motorcraft brand. As represented in the partial section view of FIG. 2, such design of oil filter port 30 contains an annular border seal surface 34 encircling a projecting central hollow post 36, the latter defining a portion of a passage 21 into the engine block. It should be noted that passage 21 branches into passages 22 and 24, as was illustrated in FIG. 1. Another passage 28 into the engine block is located between post 36 and the bordering seal surface 34. The hollow post provides an oil passage into the engine block as well as serving as a mounting post for the spin on oil filter. The spin on oil filter is well recognized and comprises a sealed cartridge, containing a threaded central passage, adapted to be screwed onto the oil filter port mounting post, and contains other passages peripheral of the central passage, intended for fluid communication with a passage in the oil filter port.

The present invention comprises a set of adapters, referred to as the oil filter port adapter set, and which is more fully illustrated in FIGS. 3 through 10 of the drawings. These adapter pieces, individually or in combination with one another can be used for connection to the oil filter port.

The adapter system associated with the flushing apparatus includes a universal coupling member or base, as variously termed, a set of principal adapters, and a set of secondary adapters. In forming an adapter for a particular engine application, a principal adapter of the correct size to fit the particular engine oil port mounting post is selected from the set and is mounted to the universal coupling member. The principal adapters are sized to couple to the oil filter's threaded mounting posts of various makes and models of automobiles and to divide the flushing fluid flow from the inlet side into different branches on the outlet side of the adapter element as hereinafter described in greater detail. The principal adapter also contains an outlet surface sized to fit one particular size annulus of an oil filter port in which event a secondary adapter, as hereafter discussed is not needed. The secondary adapters are used to compensate for different size annular oil port seal surfaces in instances where the principal adapter does not fit the annulus. Each secondary adapter mounts to any of the primary adapters.

Reference is made to FIG. 3, which provides a section view of the oil filter port adapter 7 and to the exploded view of FIG. 4, which may be considered concurrently. The adapter includes a base or universal adapter coupling, as variously termed, formed in two parts, base members 23 and 25, a principal adapter, 27, sometimes referred to as an oil filter port post adapter, a secondary adapter 29, sometimes referred to as an oil filter port outer diameter adapter, the latter of which is necessary for some models of automobile engines. Each of the foregoing are formed of metal, suitably aluminum. In general, the adapter coupling, as well as the attached adapters, have a generally cylindrical shape to the outer surface. These elements are shown assembled together in serial order in a nesting relationship and are secured together by screw threads. The individual portions of the adapter define an internal fluid passage from the input tube 35 and through the assembly, that extends laterally, for the most part, along axis 31, and branches at adapter 27 into essentially two passages the first of which is the large central passage along axis 31, which ultimately is coupled through to the passage in the hollow mounting post of the oil filter port, and the second of which extends through the smaller sized openings, only two of which 42a and 42b, are illustrated in the figure, that couple to the secondary passage in the oil filter port.

Base portion 23 contains an input pipe fitting 33 that is connected to hose 5, partially illustrated, from the flushing equipment. The pipe fitting leads into an internally formed pipe threads in a passage oriented orthogonal to the axis of the base portion, which intersects the axially extending passage 37. To the right, a protruding axially extending hollow circular male coupling member 38 extends into mating engagement within a corresponding cylindrical walled portion of the complementary base member 25, the female portion of the coupling between the two portions to provide a secure fluid passage. Except for passage 35 and set screw 41 and the latter's screw passage, discussed hereafter, the coupler geometry is generally symmetrical about center line or axis 31.

An annular slot 39 in the outer wall of cylindrical portion 38 circumscribes the outer peripheral surface, that is, the slot extends about the passage axis. Complementary member 25 contains a threaded passage that extends through the outer wall orthogonal to the passage axis in an axial position that overlies slot 39. With the two members assembled together, a set screw 41 is threaded into the threaded passage and is screwed down until it extends into slot 39. This serves to prevent the two coupling parts from separating by being pulled apart. It also allows the two members to rotate in position relative to one another, since the end of the set screw rides along the peripheral slot. With such rotatable mounting between the coupling elements one may grip hose 5 and rotate base member 23 as may assist in installing the adapter in situations where there is limited clearance and/or obstructions in the automobile's engine compartment. It is recognized that equivalent forms of rotatable mountings may be substituted and that, as example, a friction fit pin, may replace the set screw in instances where one does not plan to disassemble the coupling base for maintenance or any other purpose.

Because the universal coupling is formed in two parts as described, a potential fluid leakage path exits at the juncture between those two elements. As an additional feature of the invention, the base member incorporates a rotary gland, a conventional sealing device for rotary members. Forming such gland, the inside cylindrical wall of member 25, contains an annular slot axially positioned within the female coupling portion thereof that circumscribes-portion 38 of the complementary base member. An O-ring seal 43 is seated within that slot and frictionally engages the outer surface of the male member 38 as well as the walls of the slot. The seal serves to prevent fluid in the internal passage from escaping the coupling parts. It also allows one of the base members 23 and 25 to rotate relative to the other, whereby during rotation one such base member slides along the surface of the seal.

At the right end coupling member 25 is flared to an enlarged diameter. It contains a short cylindrical section having internally threaded internal walls 45 for threaded engagement with one of the principal adapters 27. The right facing rim of that short section contains a peripherally extending slot that in turn seats an O-ring seal 47, which in turn seals against a confronting rim of principal adapter 27, assembled thereto as illustrated. This is better illustrated in the exploded view of the assembly, illustrated in FIG. 4. The construction of the principal adapter 27 is next considered.

FIGS. 5a, 5b and 6 further illustrate the principal adapter in front, rear and side view, respectively, and are next considered in addition to the section views of FIGS. 3 and 4. The adapter is a generally disk shaped member, suitably formed of aluminum, containing a protruding cylindrical portion 49 or hub that contains a threaded outer surface 51 to enable the adapter to be fastened to base member 25, illustrated in FIG. 3. A circular rim portion to the adapter which borders the outer edge is flat in geometry so that, when assembled to the coupling member 25, the surface provides a better seal to O-ring seal 47 on the base portion, earlier described in FIGS. 3 and 4. On the opposite side, principal adapter 27 includes an O-ring seal 44. The O-ring seal is seated within a groove or slot 50, as variously termed, visible in FIG. 6, that is formed within and recessed from the outer surface of the rim and peripherally encircles the rear face of the adapter. The underside cylindrical surface of that rim is threaded with screw threads 46, allowing a secondary adapter to be screwed in place.

The cylindrical hub 49 on the reverse face of the adapter surrounds a bowl shaped portion recessed from the front face, which is best illustrated in the section view of FIG. 4. A large circular axially extending passage 40 is located within the principal adapter, extending through the bottom of the bowl shaped recessed portion. Four identical axially extending passages 42a, 42b, 42c and 42d are symmetrically distributed about and are equi-distant from the central passage.

It is appreciated from the foregoing figures, that central passage 40 is larger in cross section area than any of the smaller passages 42a–42d and that passage 21 through the oil filter mounting post 36, in FIG. 2, is also larger than any of those smaller passages. During operation in which the oil filter port adapter is assembled onto the oil filter mounting post with passage 40 threadingly secured to the threaded exterior of the oil port's mounting post, the flow of cleaning fluid through the cross section area of the central passage, essentially the cross section area of passage 21 in the oil filter mounting post, A1, is intended to be larger than the flow collective cross section areas of all of those small passages, A2, A3, A4, and A5, in total, At. In the preferred embodiment of the invention the selected flow ratio between the flow through the cross section area of the central passage, A1, defined by the hollow of the mounting post, to the flow through the total cross section areas of the individual smaller passages, At, is approximately 4:1. For convenience, the description of the selection of the diameter and, hence, cross section of the smaller peripheral holes or passages, as variously termed, is considered in the discussion of operation later in this specification.

Principal adapter 27 is one of a set of such pieces, all of which can be joined to the universal coupling 25. In a practical embodiment of the invention, at least six such adapters are employed, differing from one another essentially in the size of the central passage 40 and the size of the peripheral passages 42a–42d. However, each such adapter provides the same flow ratio between its respective central and peripheral passages.

The same flow ratio is used in all of the primary adapters, a principal feature of the present invention, and the flow ratio thus selected or otherwise derived is a constant. The diameter, configuration and conductance of the adapter passages serves as a means to regulate or control the relative distribution and flow of the flushing fluid being pumped from the flushing equipment to one side of the adapter as between the engine channels directed to the oil pump and those oil passageways directed to the principal engine components. For a given engine applicant's presently believe that approximately four times more cleaning fluid should be directed to the engine components, where more of the sludge is generally formed, than to the engine oil pump and associated circuit.

While four small passages are used in this embodiment, it is recognized that in other embodiments, different numbers of small passages may be used. Notwithstanding the flow ratio through the cross section areas described, should be maintained.

It is recognized that perhaps some model of a prior adapter, which must also contain at least a central and outer passage in the adapter, may contain a flow ratio between the cross section areas, that falls within the aforedescribed range of 2 to 8, and, indeed may contain one that by chance, would have a ratio of four, purely by chance, although the present applicant's have not investigated and/or verified any such prior adapters, but to applicant's present knowledge, whatever the ratio may be, the identical ratio is not maintained throughout the set of adapters associated with such flushing apparatus. In those instances, as earlier described in the background to this specification, for a given prior flushing apparatus, containing multiple adapters, the flow ratio for the cleaning fluid varies from engine to engine with different adapters in the flushing apparatus.

For operator convenience, each of the adapters may be given a separate distinctive color. With experience in treating make and models of engines, the operator will associate color with a particular engine.

Returning to the exploded view of FIG. 4, the next step in the assembly is to select and install the secondary adapter, 29. As represented in FIG. 4, adapter 29 is one of a set of such adapters that includes other adapters, illustrated in this figure as 29b and 29c. Each of those secondary adapters is of a different outer diameter and have different diameter o-ring seals, appropriate to the different outer diameters of the oil filter port of different automobiles. The secondary adapter contains a large central opening 19, and so, cannot obstruct the fluid which exits from the two sets of passages in primary adapter 27. And each of the adapters contains an annular seal surface that is flat and, when assembled abuts against o-ring seal 44 of the primary adapter. With the larger diameter secondary adapters 29b and 29c, the annular seal surface is preferably formed as an annular channel or recess so as to allow the outer edge of the primary adapter to be received in the channel in mating engagement.

It may be noted at this juncture that the assembly of the coupling member 23, 25 and the adapter 27 alone is sufficient to provide for connection to the oil filter port of at least one model of engine, in which case the secondary adapter 29 is not necessary. If already assembled as illustrated earlier in FIG. 3, the secondary adapter is detached and replaced in the flushing apparatus storage rack.

Reference is made to FIG. 7, which illustrates the secondary adapter in front view, FIG. 8 in side view and FIG. 9, illustrating a rear view of the secondary adapter. As illustrated, the adapter is a generally disk shaped short cylinder formed of metal, suitably aluminum, that contains an short cylindrical portion or hub 52, projecting from the front face, which serves as a male coupling to the mating primary adapter earlier selected for the assembly. That cylindrical portion contains a threaded outer surface for screwing the adapter into the primary adapter. O-ring seal 48 is carried by a circumferential slot in the face of the primary adapter.

Considering conventional oil port constructions as found in modern automobiles, earlier described, it is appreciated that different models of automobiles contain oil ports seal surfaces of different diameter. That outer diameter may vary even though the post diameter might remain the same.

For a given automobile, the secondary adapter is selected so that the o-ring seal is of like diameter and engages the oil ports seal surface. Thus a variety of different diameter O-ring seals and the supporting adapter, also of different diameter, must be provided with the flushing equipment. This allows the equipment to service the vast majority of automobiles. To assist the operator in making the selection and minimizing possible confusion, each of the outer diameter adapters is anodized a different color.

The present invention also provides a second adapter set, referred to as the oil drain plug port adapter set, and which is more fully illustrated in FIGS. 10 and 11 of the drawings. These adapter pieces, like those previously described for the principal adapter, individually or in combination with one another can be used for connection to the oil pan drain outlet. Referring to the section view of FIG. 10 and the exploded section view of FIG. 11, the drain port adapter is seen to contain a two part base portion, comprising the left portion 53 and the right base portion 55 that are rotatably mounted to one another by means of the rotatable joint formed by peripherally extending slot 54 in the short cylindrical male coupling member, which extends in mating engagement with the corresponding female opening in the adjacent portion, and set screw 56, extending into the slot.

The assembly also incorporates a rotary gland, formed of 0-ring seal 57 disposed within a peripherally extending slot formed in the internal cylindrical surface of the female coupling section of the right base portion 55. A pipe fitting 58 engages the threads of a cylindrical passage that is oriented transverse to the axis 59 of the principal passage through the adapter. The pipe fitting is connected to the return conduit or hose, partially illustrated, corresponding to conduit 9 in FIG. 1.

The right coupling member contains a reduced diameter protruding cylinder or hub and threads 63 are formed in the outer surface of the hub, as shown in the exploded view of FIG. 11 for threaded engagement with the screw threads 62 on the inner cylindrical walls within the central passage in adapter 60. The adapter also contains a protruding short cylindrical end portion, shown to the right in the figure. Threads 64 are formed on the outer surface of that hub. The right annular face of coupling member 55 contains a peripheral slot and an O-ring seal 61 is disposed in the slot.

In rare cases the particular engine may contain a drain plug that is recessed in an indentation in the oil pan. In that instance the wide diameter annular portion of the adapter shown in FIGS. 10 and 11 would obstruct insertion of the head end. For that eventuality the adapter geometry presented in FIGS. 12 and 13, in side section view and front view, respectively, is used. For convenience the elements of this adapter that are common to the adapter of FIG. 10 are identified with the same numbers and primed. The adapter contains a reduced diameter annular portion 65. The diameter is such as allows the reduced diameter portion to fit in the oil pan recess and allows the threaded end 64 to be screwed into the oil plug port.

In preparing for operation a particular primary adapter 27 is selected from the set of primary adapters to fit the post 36 in FIG. 2 and the primary adapter is screwed into place on the oil filter port. The main adapter coupling 25 is then screwed into place on the primary adapter and then hose 5 is connected to the main adapter coupling. If the diameter of the selected primary adapter is insufficient to seal against the outer port seal surface 34, then the appropriate size secondary adapter 29 is first selected and screwed into the primary adapter, which is the assembly illustrated in FIG. 3. A like selection is made of a oil drain port adapter 60 from the set of such adapters. The adapter is screwed into place in the drain plug port. Then the main oil drain port adapter coupling 55 is screwed into place on the adapter and hose 9 connected. In operation, as in FIG. 1, cleaning fluid is pump through hose 5 and into and through the primary adapter which divides that between the two engine passages, with the flow rate ratio therebetween being at the set value. And, as in the prior flushing apparatus, the fluid is returned to the oil drain pan, and exits through the drain pan port adapter where it returns to the flushing apparatus via hose 9.

At this juncture one considers further, the criteria by which the flow rate ratio between passage 40 in the primary adapter and the peripheral passages 42a–42d in that adapter, best illustrated in FIG. 5a is established and is a constant for all primary adapters in the set, resulting from the size of the peripheral passages in each adapter. The diameter and, hence, cross section of the central passage in the adapter is a given. For any particular adapter in the set the inner diameter of the threaded central passage is the same diameter as the outer threaded oil filter post of the oil filter port in the particular engine, with which it must mate. Those port diameters are defined by each engine manufacturer. As example one of the adapters in the present invention contains a 0.75 inch threaded diameter passage, which mates with the outside threaded diameter of the oil filter port mounting post of one particular engine manufacturer. The inside diameter of that oil filter post is 0.50 inch, which is also set by the engine manufacturer. When the adapter is assembled to the post the central passage diameter effectively reduces to the diameter and cross section of the hollow passage in the post, namely the 0.50 inch diameter in the given example.

The diameter of the smaller peripheral holes, 42a–42d, is then selected in order that the ratio of the flow rates to be obtained through such holes in relationship to that from the central passage as assembled to the hollow post, that is, the ratio of the flow rate through the central passage, defined by the passage through the hollow oil port post, to the flow rate through the sum of the four smaller passages peripheral of the central passage, should be the constant selected. As earlier noted, in accordance with the present cleaning theory, that constant is approximately the number 4. However, it should again be noted, that such constant could change in practice as the cleaning theory advances and more practical experience is acquired. Hence, though preferred at the present, the present invention does not depend upon that particular value.

The flow rate through a passage depends upon a number of variables, including the passage's cross section area, the edge of the opening, that is whether the edge is sharp, which is the case illustrated in the present adapters, or rounded, and the passages length. Of those factors, the cross section area is a principal contributor to the flow rate.

While it is understood that the peripheral hole diameters and the total cross section areas of all of the peripheral holes will be smaller than the cross section area of the central passage, one is further aided in an initial size selection by resorting to known engineering equations to mathematically calculate a diameter. A convenient source for such calculation are the empirical formulas developed by the Engineering Division of the Crane Company, 4100 S. Kedzie Ave., Chicago, Ill., a well known valve manufacturer, which appear in that company's Technical Paper No. 410, entitled "Flow of Fluids through Valves, Fittings and Pipes, Copyright 1969, 13th printing 1973, particularly the equations for pressure drop and fluid flow at Section 3 page 4, incorporated herein by reference. Using the initial conditions for the hole the equations are followed, until a hole size is determined.

To thereafter tailor the peripheral hole size, one should place the adapter in a test fixture, apply fluid and measure the relative flow rates, using appropriate test equipment. As necessary, the hole size is changed and again measured. At the conclusion of such a trial and error process, one is able to set the diameter of those holes precisely to the size (and shape) that results in the particular value of flow rate ratio being sought, such as 4. In a sense, tailoring the size through testing, though the better practice to achieve a sought after number, is regarded as optional at present.

In the practice of the present invention, one may choose to rely solely upon the mathematical calculation for the selection of hole size, without actual testing and measurement of the flow rates, and without the additional trial and error in sizing of the holes, as would ensure precise setting of the flow rate ratio at the constant of 4; and some number, other than 4 may in fact result. Indeed, some number between 2 and 8, including fractional numbers in between may, in the future be found to be the more desirable constant number or value that in practice yields superior engine cleaning. In accordance with the present invention there should be constancy in the value of the constant from oil filter port adapter to adapter, irrespective of the diameter of the oil filter port passages. Thus in designing the set of adapters, given the various oil filter port diameters set by the various engine manufacturers, as long as one runs the same mathematical calculation to determine the diameter of the small peripheral holes and their total cross section for each of the adapters, all of the adapters in the set will have the same flow rate ratio, irrespective of whether the actual constant flow rate ratio achieved, as example, is 4, 3.25, 3.57, or 6.

In the one specific example of adapter, as assembled to the oil filter port, cited in which the central passage filter post inner diameter is 0.50 inch, each of the four peripheral holes was designed to be 0.180 inches in diameter and contains sharp edges. And the flow rate ratio was determined to be 3.57. It is anticipated that the peripheral hole diameter is reduced slightly to perhaps 0.176 inch diameter, a flow rate ratio of 4.0 should be achieved. It should be noted from that example that a very slight change in hole size produces substantial change in the flow rate ratio.

It may be noted that any relationship between the number of peripheral holes 42 in the adapter, four as depicted in the illustrated embodiments, and the preferred flow rate ratio of 4, appears to be purely coincidental.

Although the two part coupling presented in the earlier figures is preferred, it is appreciated that an alternative coupling may comprise a more simple one piece structure with a simple swivel connector, such as is illustrated in the alternative embodiment of FIGS. 14 and 15. For convenience, parts which are used in the prior embodiment are identified by the same number in these figures, and corresponding elements are identified by the same number and primed. As illustrated in the exploded section view of FIG. 15, oil port adapter coupler 23' is formed of one piece, is generally cylindrical in outer geometry, contains an internal passage 37' having inner walls of cone shape geometry, carries an o-ring seal 47' in an annular slot in the annular front edge, and a threaded inner cylindrical wall portion 45' for securing threaded engagement with a primary adapter 27, essential identical to the prior two part coupling. Coupling 23' also contains a rear threaded cylindrical passage 66, through the rear wall. An elbow type connector, 67, screws into place within passage 66. The connector is of standard construction and contains a standard swivel joint. Hence, once screwed into place the connector may pivot about the axis of the passage. Hose 5 is connected to the connector to complete the fluid conduit to the flushing apparatus. Primary adapters 27 and secondary adapters 29 are the same as in the prior embodiment.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. An improved engine flushing system for circulating flushing fluid through internal combustion engines of a plurality of makes and models to clean said internal combustion engines, said engines being of the type containing an engine block, an oil drain pan having an oil drain plug port and an oil filter port on said engine block, said oil filter port including a first oil passage into said engine block for routing oil from the oil filter port to the crankshaft and other internal engine components and a second oil passage for routing fluid from the drain pan and oil pump to said oil filter port;

said flushing system including:
flushing apparatus for delivering a volume of flushing fluid and receiving used flushing fluid for a predetermined interval of time;
first hose means for conducting flushing fluid from said flushing apparatus to said oil filter port and second hose means for conducting flushing fluid from said oil drain plug port to said flushing apparatus;
a set of oil filter port adapters, said adapters individually or in combination being capable of connecting said first hose means to the oil filter port of any of said plurality of makes and models of engines;
said flushing apparatus and said adapters providing a predetermined flow of flushing fluid into said first oil passage and a second predetermined flow of flushing fluid into said second oil passage, said first predetermined flow to said second predetermined flow bearing a predetermined relatively constant ratio, irrespective of the make and model of said selected engine; and wherein said adapter set includes:
a set of primary adapters, each of said primary adapters having a first passage means for fluid communication with said first oil passage means of said oil filter port and second passage means for fluid communication with said second oil passage means of said oil filter port; said first passage means having a given cross section area and said second passage means having another cross section area; and wherein the ratio of the cross section area of said first passage means to the cross section area of said second passage means in each of said primary adapters is such that the ratio of fluid flow between the first and second passage means is a constant.

2. An adapter system for use with an internal combustion engine flushing apparatus, which permits universal connection to the oil filter port and oil drain pan of a large number of different sizes and types of internal combustion engines for introducing flushing fluid through the oil filter port and draining of said fluid through the oil drain pan port, said oil filter port containing a hollow cylindrical mounting post, said hollow in said cylindrical mounting post defining a first passage through which oil is supplied to the engine components from said oil filter port during engine operation and a second passage from the oil pump in said internal combustion engine through which oil is supplied to said oil filter port during engine operation, said adapter system comprising:

a flushing system adapter set, comprising a primary adapter set and a secondary adapter set, said primary adapter set comprised of a plurality of adapter pieces which are selectively usable at the oil filter port individually or in combination with a selected one of said secondary adapters fitting to the oil filter port of substantially most internal combustion engines and creating a liquid tight seal therewith each said primary adapter within said set of adapters including:

a body having an inlet and an outlet side and defining first and second fluid passage means between said inlet and outlet sides, said body including means for coupling said first fluid passage means to said first passage of said oil filter port, and said second fluid passage means to said second passage of said oil filter port;

said first fluid passage means having a first predetermined cross section area sufficient to surround said first passage of said oil filter port, said first passage of said oil filter port having a cross section area, A1, and said second fluid passage means having a predetermined cross section area, At, such that the ratio of flow through said A1 and At is a predetermined constant;

coupling means for coupling said inlet side of said primary adapter to receive flushing fluid from a flushing apparatus, whereby said flushing fluid is distributed in said body between said first and second fluid passage means; and a drain pan port adapter set comprised of a plurality of adapter pieces which are selectively usable at the drain pan port, said drain pan port adapter pieces individually fitting the drain pan port of substantially most internal combustion engines and creating a liquid tight seal therewith.

3. The invention as defined in claim 2, wherein said predetermined constant is approximately 4.

4. The invention as defined in claim 2, wherein said second fluid passage means comprises a plurality of individual passages for conducting fluid in parallel, each of said individual passages having a cross section area smaller than At and wherein the sum of the cross section areas thereof in total is no greater than At.

5. The invention as defined in claim 2, wherein said coupling means comprises:

a first base portion and a second base portion, said base portions defining an axially extending fluid passage therethrough;

said first base portion, including
conduit coupling means for coupling to a hose from said flushing equipment;

said second base portion, including thread means for coupling to said oil filter post adapter;

said first base portion being rotatably mounted to said second base portion to permit said first base portion to be rotatably moved relative to said second base portion; and rotary gland means, said rotary gland means being mounted between said first and base second portions for preventing leakage of fluid from said fluid passage from the juncture between said first and second portions without restricting rotatable movement therebetween.

6. The invention as defined in claim 5, wherein said rotary gland comprises:

O-ring seal means defining a circle, said O-ring seal means frictionally engaging said first and second base portions and circumscribing said fluid passage to provide a fluid seal between said base portions, while permitting one of said base portions to frictionally slide against said O-ring seal means responsive to relative rotational movement between said first and second base portions.

7. The invention as defined in claim 5, wherein said rotary gland comprises:

a slot in at least one of said base portions, said slot extending in a circle circumscribing said fluid passage; and O-ring seal means defining a circle, said O-ring seal means being seated in said slot and being adapted to engage said first and second base portions to provide a fluid seal therebetween while permitting said base portions to rotationally move relative to one another with slidable frictional engagement with said O-ring seal means.

8. An adapter set for use with an internal combustion engine flushing apparatus permitting connection of a conduit from the apparatus at the oil filter port leading to the lubrication system of the internal combustion engine, said oil filter port containing a first passage through which oil is supplied to the engine components from said oil filter port during engine operation and a second passage from the oil pump in said internal combustion engine through which oil is supplied to said oil filter port during engine operation, said adapter set comprising:

a flushing system adapter set, comprising a primary adapter set and a secondary adapter set, said primary adapter set comprised of a plurality of adapter pieces which are selectively usable at the oil filter port individually or in combination with a selected one of said secondary adapters fitting to the oil filter port of substantially most internal combustion engines and creating a liquid tight seal therewith;

each said primary flushing system adapter within said set of adapters including:

a body having an inlet and an outlet side and defining first and second fluid passage means between said inlet and outlet sides, said body including means for coupling said first fluid passage means to said first passage of said oil filter port and said second fluid passage means to said second passage of said oil filter port;

said first fluid passage means having a predetermined cross section area sufficient to cover said first passage of said oil filter port, said first passage of said oil filter port having a cross section area, A1, and said second fluid passage means having a predetermined cross section area, At, and wherein the ratio of flow through said A1 and At is essentially a predetermined constant.

9. The invention as defined in claim 8 wherein said predetermined constant is 4.

10. The invention as defined in claim 8, comprising in combination therewith:

coupling means for coupling said inlet side of said primary lubrication adapter to receive flushing fluid from a flushing apparatus, whereby said flushing fluid is distributed in said body between said first and second fluid passage means.

11. The invention as defined in claim 8, wherein said predetermined flow constant is a number, including any fractional number, falling at or within the range of 2.0 and 8.0.

12. The invention as defined in claim 8, wherein said predetermined flow constant is the number 3.57.

13. An adapter set for use with an internal combustion engine flushing apparatus permitting connection of a conduit from the apparatus to the oil drain pan plug port:

coupling means having an inlet side and an outlet side, with said outlet side being connected to said flushing apparatus;

an oil drain pan plug port adapter set, comprising a primary adapter set and a secondary adapter set, said adapter set comprised of a plurality of adapter pieces which are selectively usable at the drain pan plug port, each of said adapter pieces being individually connectable to said inlet side of said coupling means;

said coupling means further comprising:

a first base portion and a second base portion, said base portions defining an axially extending fluid passage therethrough;

said first base portion, including conduit coupling means for coupling to a hose from said flushing equipment;

said second base portion, including thread means for coupling to said drain pan port adapter;

said first base portion being rotatably mounted to said second base portion to permit said first base portion to be rotatably moved relative to said second base portion; and rotary gland means, said rotary gland means being mounted between said first and base second portions for preventing leakage of fluid from said fluid passage from the juncture between said first and second base portions without restricting rotatable movement therebetween;

said rotary gland further comprising:

O-ring seal means defining a circle, said O-ring seal means frictionally engaging said first and second base portions and circumscribing said fluid passage to provide a fluid seal between said base portions, while permitting one of said base portions to frictionally slide against said O-ring seal means responsive to relative rotational movement between said first and second base portions.

* * * * *